(12) United States Patent
Li et al.

(10) Patent No.: US 8,249,320 B2
(45) Date of Patent: Aug. 21, 2012

(54) METHOD, APPARATUS, AND PROGRAM FOR MEASURING SIZES OF TUMOR REGIONS

(75) Inventors: Yuanzhong Li, Tokyo (JP); Satoshi Ihara, Tokyo (JP); Yoshiyuki Moriya, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 712 days.

(21) Appl. No.: 12/354,529

(22) Filed: Jan. 15, 2009

(65) Prior Publication Data

US 2009/0180677 A1    Jul. 16, 2009

(30) Foreign Application Priority Data

Jan. 16, 2008    (JP) ................. 2008-006424

(51) Int. Cl.
*G06K 9/00*    (2006.01)
(52) U.S. Cl. ......... 382/128; 382/131; 382/133; 382/286
(58) Field of Classification Search .............. 382/128, 382/131, 133, 286
See application file for complete search history.

(56) References Cited

U.S. PATENT DOCUMENTS

| | | | |
|---|---|---|---|
| 5,984,870 A * | 11/1999 | Giger et al. | 600/443 |
| 6,973,212 B2 | 12/2005 | Boykov et al. | |
| 2005/0129297 A1 | 6/2005 | Kamath et al. | |

FOREIGN PATENT DOCUMENTS

| | | |
|---|---|---|
| JP | 8-299341 A | 11/1996 |
| JP | 2003-265475 A | 9/2003 |

OTHER PUBLICATIONS

Therasse et al., Special Article, RECIST Guidelines, Journal of the National Cancer Institute, Feb. 2, 2000, vol. 92, No. 3, pp. 205-216.
Boykov et al., Proceedings of "Internation Conference on Computer Vision", Vancouver, Canada, Jul. 2001, vol. I, pp. 105-112.

* cited by examiner

*Primary Examiner* — Arnold Kinkead
*Assistant Examiner* — Richard Tan
(74) *Attorney, Agent, or Firm* — Birch, Stewart, Kolasch & Birch LLP

(57) ABSTRACT

A tumor region is determined within a three dimensional medical image. A long axis and a short axis of the determined tumor region are designated. The lengths of the designated long axis and the designated short axis are measured. The measured lengths of the long axis and the short axis are displayed.

21 Claims, 5 Drawing Sheets

REFERENCE POINT

METHOD, APPARATUS, AND PROGRAM FOR MEASURING SIZES OF TUMOR REGIONS

BACKGROUND OF THE INVENTION

1. Field of the Invention

The present invention is related to a method, an apparatus, and a program for measuring the sizes of tumor regions that appear within three dimensional medical images.

2. Description of the Related Art

Conventionally, the malignancy of tumors have been evaluated by measuring the greatest diameter within a horizontal cross section (a plane that perpendicularly intersects the body axis of the tumor) of a tumor and using the measured value as an index, as disclosed in "New Guidelines to Evaluate the Response to Treatment in Solid Tumors", P. Therasse et al., RECIST Guidelines, Journal of the National Cancer Institute, Vol. 92, No. 3, pp. 205-216, 2000.

However, in these two dimensional evaluation methods that employ the long axes (greatest diameters) and short axes of ovals that approximate the horizontal cross sections of tumors, the indices of evaluation do not appropriately reflect the three dimensional sizes of the tumors, and there are cases in which accurate evaluations cannot be performed.

On the other hand, techniques for generating three dimensional images, which are groups of great numbers of two dimensional images obtained by CT apparatuses, MRI apparatuses, ultrasound apparatuses and the like, of subjects have emerged recently. Methods for obtaining the volumes of tumors from three dimensional medical images have been proposed. Japanese Unexamined Patent Publication No. 8(1996)-299341, U.S. Patent Application Publication No. 20050129297, and Japanese Unexamined Patent Publication No. 2003-265475 disclose methods in which the volumes of tumors as indices are employed to judge the sizes of the tumors.

However, it is a fact that the lengths of the long axes and short axes of horizontal cross sections which are perpendicular to the body axes of tumors are used as indices for evaluations thereof, according to guidelines such as those disclosed in the aforementioned RECIST Guidelines, in clinical practice. There is demand for long axes and short axes that more appropriately reflect the three dimensional sizes of tumors to be provided, not only the volumes provided by the methods disclosed in the aforementioned Japanese Unexamined Patent Publications.

SUMMARY OF THE INVENTION

The present invention has been developed in view of the foregoing circumstances. It is an object of the present invention to provide a method, an apparatus, and a computer program for measuring the sizes of tumor regions, which are capable of providing long axes and short axes that accurately reflect the three dimensional sizes of tumors.

A tumor region size measuring method of the present invention comprises the steps of:

determining a tumor region from a three dimensional medical image;

designating a long axis and a short axis of the determined tumor region; and obtaining the lengths of the designated long axis and the designated short axis as the size of the tumor region.

Here, the long axis and the short axis refer to a long axis and a short axis that perpendicularly intersect each other within the tumor region. The long axis and the short axis appropriately reflect the three dimensional size of a tumor, to be employed in accurate evaluation thereof.

In the above method, a configuration may be adopted wherein the designation of the long axis and the short axis comprises the steps of:

setting an arbitrary point within the determined tumor region;

designating a line segment having the greatest length from among a plurality of line segments that pass through the set arbitrary point and the ends of which are positioned on the outline of the tumor region, as the long axis;

detecting a cross section of the tumor region having the greatest area from among cross sections of the tumor region that include the long axis; and designating a line segment having the greatest length from among a plurality of line segments within the detected cross section that perpendicularly intersect the designated long axis and the ends of which are positioned on the outline of the tumor region, as the short axis.

Here, a configuration may be adopted, wherein:

the setting of the arbitrary point is performed by setting a plurality of arbitrary points at the centers of gravity of a plurality of cross sections of the tumor region;

the designation of the long axis is performed by obtaining a line segment having the greatest length from among a plurality of line segments that pass through each of the set arbitrary points and the ends of which are positioned on the outline of the tumor region, and designating the line segment having the greatest length from among the obtained line segments.

The "line segment having the greatest length from among a plurality of line segments that pass through each of the set arbitrary points and the ends of which are positioned on the outline of the tumor region" does not necessarily refer to a line segment having the absolute greatest length, which is searched for from among line segments that pass through the arbitrary point is all directions. The "line segment having the greatest length from among a plurality of line segments that pass through each of the set arbitrary points and the ends of which are positioned on the outline of the tumor region" may be that which has the greatest length from among line segments that extend in a number of directions which have been thinned out to a degree that does not practically deteriorate the evaluation results of the tumor. Similarly, the "cross section having the greatest area", the "line segment . . . which has the greatest length", and the phrase "two points . . . having the greatest distance therebetween" do not necessarily refer to those which have been obtained by thoroughly searching the search ranges for each object in the present specification. The "cross section having the greatest area", the "line segment . . . which has the greatest length", and the phrase "two points . . . having the greatest distance therebetween" may be those which have been searched for among search ranges which have been thinned out to a degree that does not practically deteriorate the evaluation results of the tumor.

Alternatively, a configuration may be adopted wherein the designation of the long axis and the short axis comprises the steps of:

setting an arbitrary point within the determined tumor region;

detecting a cross section of the tumor region having the greatest area from among cross sections of the tumor region that pass through the point;

designating a line segment having the greatest length from among a plurality of line segments within the detected cross section and the ends of which are positioned on the outline of the tumor region, as the long axis; and designating a line segment having the greatest length from among a plurality of line segments that perpendicularly intersect the designated long axis and the ends of which are positioned on the outline of the tumor region, as the short axis.

Here, a configuration may be adopted, wherein:

the setting of the arbitrary point is performed by setting a plurality of arbitrary points at the centers of gravity of a plurality of cross sections of the tumor region; and the designation of the long axis is performed by obtaining a line segment having the greatest length from among a plurality of line segments that pass through each of the set arbitrary points and the ends of which are positioned on the outline of the tumor region, and designating the line segment having the greatest length from among the obtained line segments.

As a further alternative, a configuration may be adopted wherein the designation of the long axis and the short axis comprises the steps of:

designating a line segment that connects two points on the outline of the tumor region having the greatest distance therebetween as the long axis;

detecting a cross section of the tumor region having the greatest area from among cross sections of the tumor region that include the long axis; and designating a line segment having the greatest length from among a plurality of line segments within the detected cross section that perpendicularly intersect the designated long axis and the ends of which are positioned on the outline of the tumor region, as the short axis.

As a still further alternative, a configuration may be adopted wherein the designation of the long axis and the short axis comprises the steps of:

designating a line segment that connects two points on the outline of the tumor region having the greatest distance therebetween as the long axis; and designating a line segment having the greatest length from among a plurality of line segments that perpendicularly intersect the designated long axis and the ends of which are positioned on the outline of the tumor region, as the short axis.

In all of the above methods, the designated long axis and the designated short axis may be displayed by a display means. Alternatively, the lengths of the designated long axis and the designated short axis may be displayed by the display means. As a further alternative, both the designated long axis and the designated short axis and the lengths thereof may be displayed by the display means.

In addition, the setting of the arbitrary point may be performed by setting the arbitrary point at the center of gravity of the tumor region.

A tumor region size measuring apparatus of the present invention comprises:

tumor region determining means for determining a tumor region from a three dimensional medical image;

axis designating means for designating a long axis and a short axis of the determined tumor region; and obtaining means for obtaining the lengths of the designated long axis and the designated short axis as the size of the tumor region.

A tumor region size measuring program of the present invention causes a computer to execute the procedures of:

determining a tumor region from a three dimensional medical image;

designating a long axis and a short axis of the determined tumor region; and obtaining the lengths of the designated long axis and the designated short axis as the size of the tumor region.

Note that the program of the present invention may be provided being recorded on a computer readable medium. Those who are skilled in the art would know that computer readable media are not limited to any specific type of device, and include, but are not limited to: floppy disks, CD's, RAM's, ROM's, hard disks, magnetic tapes, and internet downloads, in which computer instructions can be stored and/or transmitted. Transmission of the computer instructions through a network or through wireless transmission means is also within the scope of the present invention. Additionally, computer instructions include, but are not limited to: source, object, and executable code, and can be in any language, including higher level languages, assembly language, and machine language.

The method, apparatus, and program for measuring the sizes of tumor regions of the present invention determine a tumor region from within a three dimensional medical image, designate a long axis and a short axis of the determined tumor region, and obtain the lengths of the designated long axis and the designated short axis as the size of the tumor region. Thereby, the lengths of a long axis and a short axis that appropriately reflect the three dimensional size of a tumor can be provided.

A configuration may be adopted wherein the designation of the long axis and the short axis comprises the steps of: setting an arbitrary point within the determined tumor region; designating a line segment having the greatest length from among a plurality of line segments that pass through the set arbitrary point and the ends of which are positioned on the outline of the tumor region, as the long axis; detecting a cross section of the tumor region having the greatest area from among cross sections of the tumor region that include the long axis; and designating a line segment having the greatest length from among a plurality of line segments within the detected cross section that perpendicularly intersect the designated long axis and the ends of which are positioned on the outline of the tumor region, as the short axis. In this case, a long axis and a short axis which are appropriate as indices for evaluating a tumor can be designated.

Alternatively, a configuration may be adopted wherein the designation of the long axis and the short axis comprises the steps of: setting an arbitrary point within the determined tumor region; detecting a cross section of the tumor region having the greatest area from among cross sections of the tumor region that pass through the point; designating a line segment having the greatest length from among a plurality of line segments within the detected cross section and the ends of which are positioned on the outline of the tumor region, as the long axis; and designating a line segment having the greatest length from among a plurality of line segments that perpendicularly intersect the designated long axis and the ends of which are positioned on the outline of the tumor region, as the short axis. In this case as well, a long axis and a short axis which are appropriate as indices for evaluating a tumor can be designated.

As a further alternative, a configuration may be adopted wherein the designation of the long axis and the short axis comprises the steps of: designating a line segment that connects two points on the outline of the tumor region having the greatest distance therebetween as the long axis; detecting a cross section of the tumor region having the greatest area from among cross sections of the tumor region that include the long axis; and designating a line segment having the greatest length from among a plurality of line segments within the detected cross section that perpendicularly intersect the designated long axis and the ends of which are positioned on the outline of the tumor region, as the short axis. In this case as well, a long axis and a short axis which are appropriate as indices for evaluating a tumor can be designated.

As a still further alternative, a configuration may be adopted wherein the designation of the long axis and the short axis comprises the steps of: designating a line segment that connects two points on the outline of the tumor region having the greatest distance therebetween as the long axis; and designating a line segment having the greatest length from among a plurality of line segments that perpendicularly intersect the designated long axis and the ends of which are positioned on the outline of the tumor region, as the short axis. In this case as well, a long axis and a short axis which are appropriate as indices for evaluating a tumor can be designated.

BEST MODE FOR CARRYING OUT THE INVENTION

Figure 1:
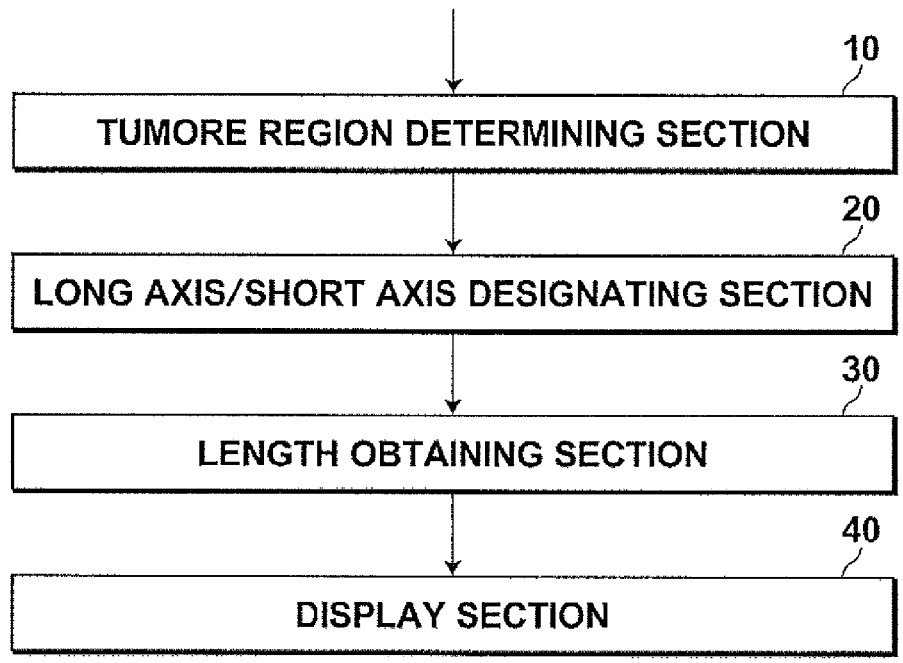
FIG. 1 is a block diagram that illustrates the configuration of a tumor region size measuring apparatus of the present invention.

Hereinafter, an embodiment of the tumor region size measuring apparatus of the present invention will be described with reference to the attached drawings. Note that the configuration of the tumor region size measuring apparatus 1 illustrated in FIG. 1 is realized by executing an image processing program, which is read out form an auxiliary memory device of a computer (such as a personal computer). At this time, the image processing program may be distributed being recorded in recording media such as CD-ROM's, or via a network such as the Internet, and installed in the computer.

As illustrated in FIG. 1, the tumor region size measuring apparatus is equipped with: a tumor region determining section 10; a long axis/short axis designating section 20; a length obtaining section 30; and a display section 40. The tumor region determining section 10 determines tumor regions within three dimensional medical images. The long axis/short axis designating section 20 designates the long axis and the short axis of the determined tumor region. The length obtaining section 30 obtains the lengths of the designated long axis and the designated short axis as the size of the tumor region. The display section 40 displays the obtained lengths of the long axis and the short axis.

Figure 2:
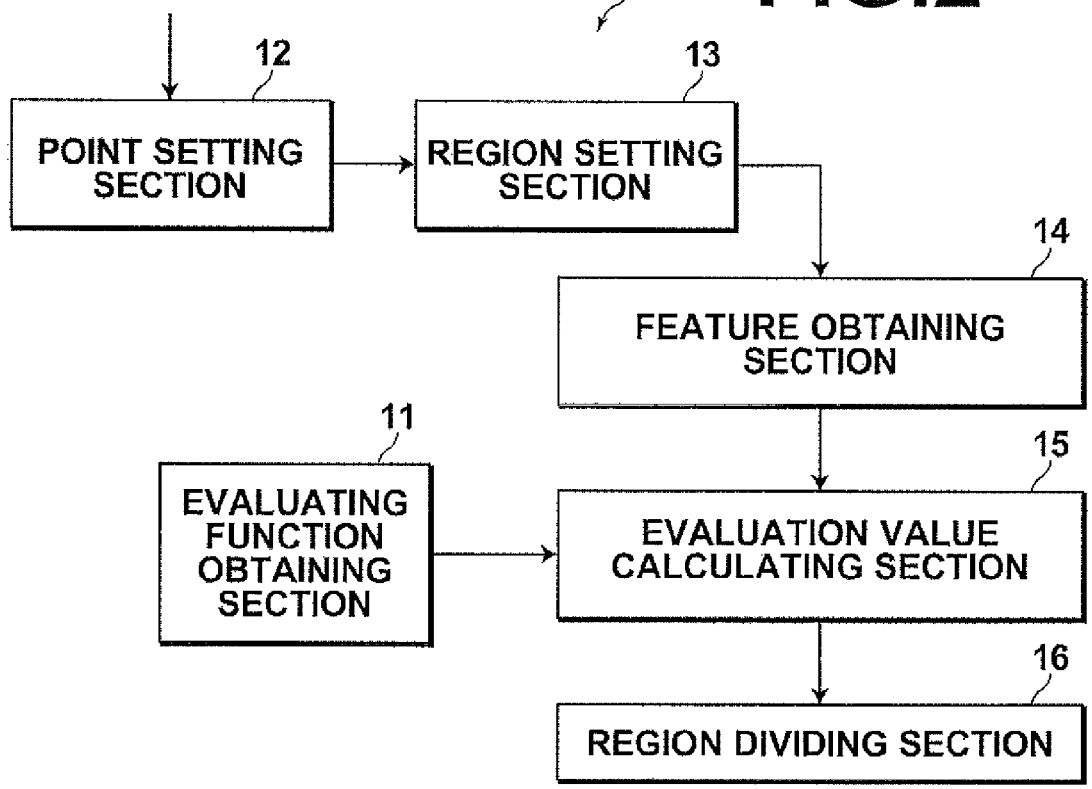
FIG. 2 is a diagram that illustrates the configuration of a tumor region determining section.

The tumor region determining section 10 determines tumor regions from within three dimensional medical images (hereinafter, referred to as "input images") which are groups of great numbers of two dimensional images obtained by CT apparatuses, MRI apparatuses, ultrasound apparatuses and the like. As illustrated in FIG. 2, the tumor region determining section 10 is equipped with: an evaluating function obtaining section 11; a point setting section 12; a region setting section 13; a feature obtaining section 14; an evaluation value calculating section 15; a region dividing section 16; and the like.

The evaluating function obtaining section 11 performs machine learning to learn the features of voxels of a plurality of three dimensional medical images (hereinafter, referred to as "sample images") that include tumor regions of which the outlines are known, employing machine learning techniques such as the Ada boosting algorithm technique, the neural network technique, and the SVM (Support Vector Machine) technique. Thereby, the evaluating function obtaining section 11 obtains evaluation functions that evaluate whether a voxel is a voxel that represents an outline of a tumor, based on the features thereof.

Specifically, brightness data within the vicinities of each voxel, for example, combinations of brightness values of voxels within a cube shaped region 5 pixels long in the X direction, 5 pixels long in the Y direction, and 5 pixels long in the Z direction, having the voxel at its center, are learned as the feature of each of the voxels. Evaluation functions are obtained that evaluate whether each voxel is a voxel that represents an outline of a tumor based on the features thereof. The obtained evaluation functions can be applied to cases in which each voxel of a three dimensional medical image is a voxel that represents an outline of a tumor.

The point setting section 12 sets arbitrary points within tumor regions in input images. For example, the point setting section 12 may set arbitrary points at positions within input images specified by operator input using a keyboard or a pointing device of the tumor region size measuring apparatus 1. Alternatively, it can be assumed that each point within tumor regions, which are automatically detected by the target region detecting method disclosed in Japanese Unexamined Patent Publication No. 8(1996)-299341, has a uniform mass, and the arbitrary points may be set at the centers of gravity of the tumor regions.

Note that the arbitrary points may be set at the approximate centers of tumor regions, or at positions shifted from the centers of the tumor regions.

The region setting section 13 sets judgment regions, which are considered to include the entireties tumor regions, within the input images, with the points set by the point setting section 12 as references. For example, regions of sizes greater than possible sizes of tumor regions having the points set by the point setting section 12 at their centers may be set as the judgment regions. Thereby, the range of regions of interest within the input images can be limited, and the following processes can be accelerated.

Note the perimeters of the judgment regions may be various shapes, such as cubes, spheres, and ellipsoids.

The feature obtaining section 14 obtains the features of each voxel within the judgment regions sets by the region setting section 13. The aforementioned brightness data within the vicinities of each voxel are obtained as the feature of each of the voxels.

The evaluation value calculating section 15 calculates evaluation values regarding whether each voxel within the judgment regions is a voxel representing the outline of a tumor, based on the features obtained by the feature obtaining section 14 and employing the evaluating function obtained by the evaluating function obtaining section 11.

The region dividing section 16 determines the outlines of tumor regions, employing the evaluation values for each voxel calculated by the evaluation value calculating section 15. For example, the Graph Cut method described in "Interactive Graph Cuts for Optimal Boundary and Region Segmentation of Objects in N-D Images", Y. Y. Boykov and M. P. Jolly, Proceedings of Internation Conference on Computer Vision, Vol. I, pp. 105-112, Vancouver, Canada, July 2001, and U.S. Pat. No. 6,973,212 may be employed to divide tumor regions from background regions. At this time, the probabilities that adjacent voxels are voxels included in the same region are calculated using the evaluation value for each voxel. The judgment regions are divided into tumor regions and background regions, based on the calculated probabilities. Thereby, tumor regions V can be determined within the three dimensional medical images, and the boundaries between the tumor regions V and the background regions are the outlines of the tumor regions V.

The long axis/short axis designating section 20 designate the long axes and the short axes of the tumor regions V, which have been determined by the tumor region determining section 10.

Figure 3:
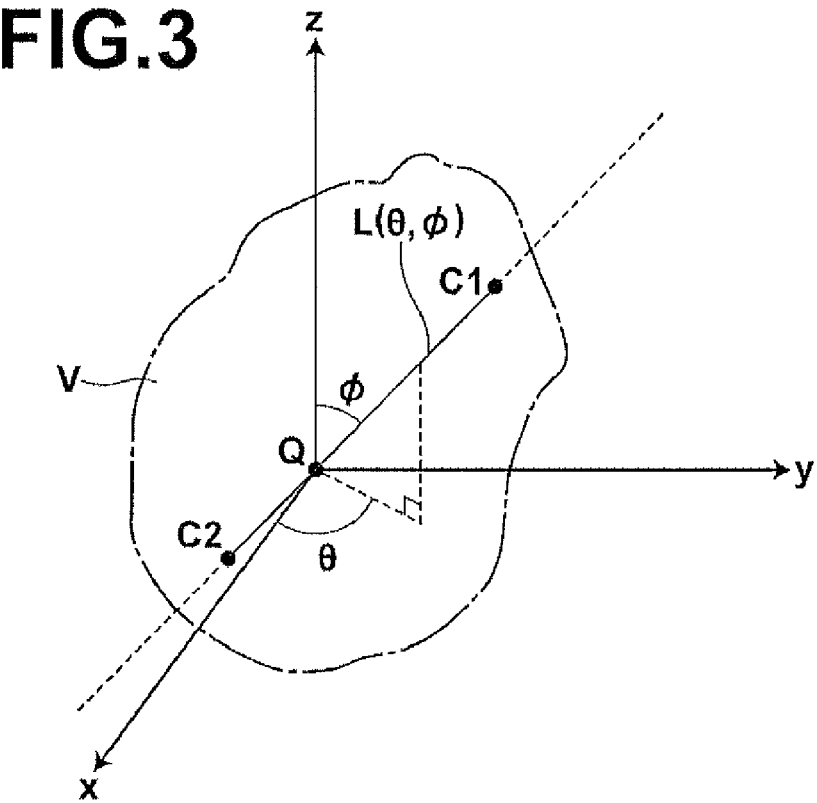
FIG. 3 is a diagram for explaining the method by which a long axis is designated by a long axis/short axis designating section in a process according to a first embodiment of the present invention.
Figure 4:
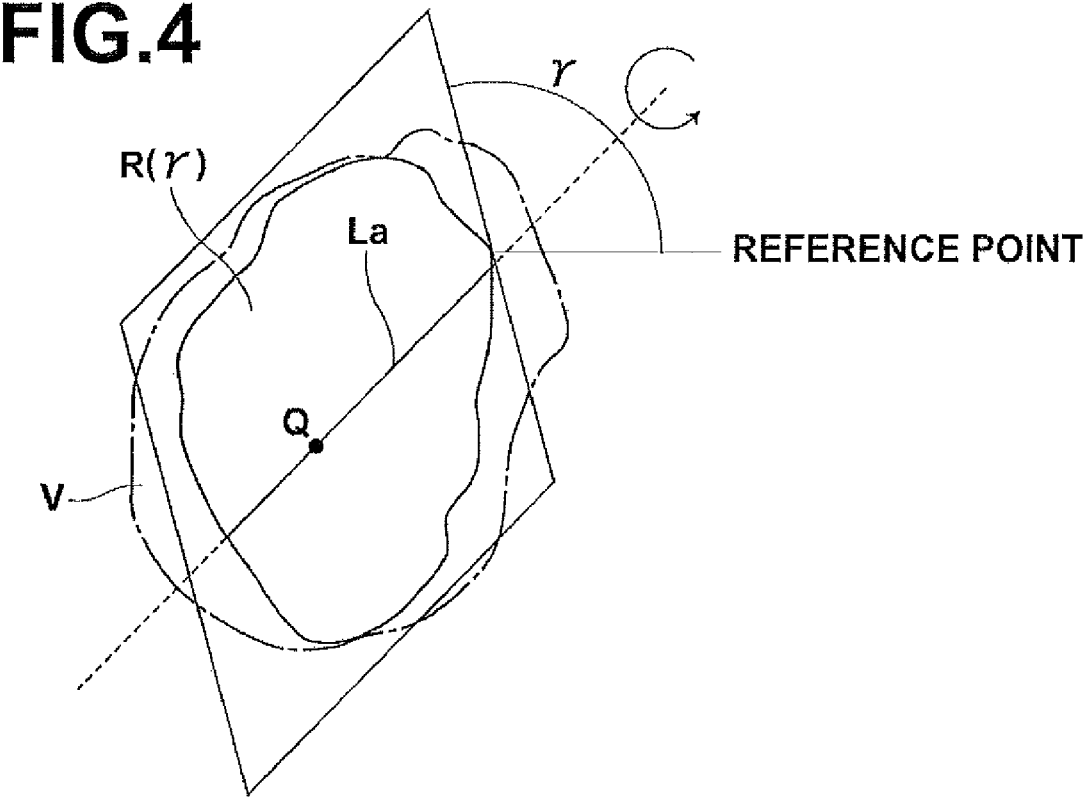
FIG. 4 is a diagram for explaining the method by which a desired cross section is detected by a long axis/short axis designating section in a process according to the first embodiment of the present invention.
Figure 5:
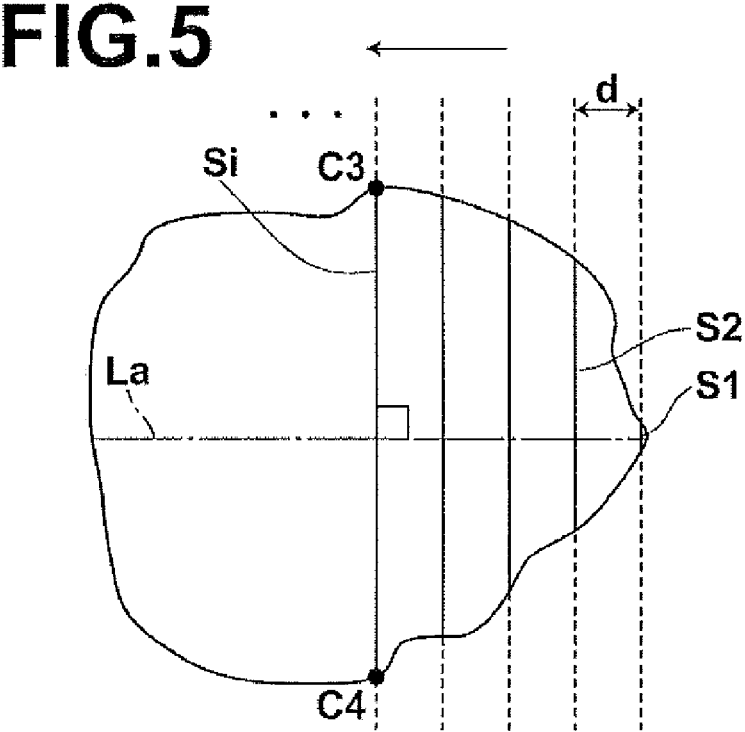
FIG. 5 is a diagram for explaining the method by which a short axis is designated by a long axis/short axis designating section in a process according to the first embodiment of the present invention.

A first embodiment of the process for designating a long axis and a short axis will be described with reference to FIGS. 3 through 5. First, an arbitrary point Q is set within a tumor region V. For example, it can be assumed that each point within the tumor region V has a uniform mass, and the arbitrary point Q may be set at the center of gravity of the tumor region V. Alternatively, the arbitrary point Q may be a position within the input image specified by operator input using a keyboard or a pointing device of the tumor region size measuring apparatus 1.

Next, a line segment having the greatest length from among a plurality of line segments that pass through the set arbitrary point Q and the ends of which are positioned on the outline of the tumor region V, is designated as the long axis. Specifically, a three dimensional coordinate system is set having the arbitrary point Q as its origin, as illustrated in FIG. 3, and directions $(\theta, \phi)$ $(0° \leq \theta \leq 360°, 0° \leq \phi \leq 180°)$ emanating from the point Q are set. Here, $\theta$ represents angles in a direction parallel to the X axis, and $\phi$ represents angles in a direction perpendicular to the Z axis. The directions $(\theta, \phi)$ are varied, by maintaining $\theta$ at 0° and sequentially changing $\phi$ from 0°, 15°, 30° ... to 180°; maintaining $\theta$ at 15° and sequentially changing $\phi$ from (0°), 15°, 30° ... 165°, (180°); ... and maintaining $\theta$ at 345° and sequentially changing $\phi$ from (0°), 15°, 30° ... 165°, (180°). Then, the lengths of line segments L $(\theta, \phi)$ that extend in the directions $(\theta, \phi)$ and which have two points C1 and C2 that intersect with the outline of the tumor region V as its ends are measured. The line segment L $(\theta, \phi)$ having the greatest length from among the line segments L $(\theta, \phi)$ is designated as a long axis La.

Note that here, a case has been described in which the line segment which has the greatest length from among line segments that extend from the arbitrary point Q in directions parallel to the X axis and perpendicular to the Z axis which have been thinned out in 15 degree increments is designated as the long axis La. The increments by which the directions are thinned out may be any amount that does not practically deteriorate the evaluation results of the tumor, and may be set arbitrarily as necessary. Alternatively, line segments that extend through the arbitrary point Q in all directions may be searched thoroughly to detect a line segment having the greatest length, and the detected line segment may be designated as the long axis La.

Next, a cross section of the tumor region having the greatest area from among cross sections of the tumor region V that include the long axis La is detected. Specifically, angles $\gamma$ $(10° \leq \gamma \leq 180°)$ are set in the counterclockwise direction from a reference point (an angular position designated as a reference) with the long axis La as the central axis, as illustrated in FIG. 4. The angle $\gamma$ is sequentially varied at increments that do not practically deteriorate the evaluation results of the tumor, for example, increments of 15 degrees. The areas of cross sections $R(\gamma)$ of the tumor region V at each of the angles $\gamma$ that include the long axis La are obtained, and a cross section Ra having the greatest area from among the cross sections $R(\gamma)$ is detected.

Note that here, a case has been described in which the cross section Ra having the greatest area was detected while varying the angle $\gamma$ at increments that do not practically deteriorate the evaluation results of the tumor. Alternatively, the angle $\gamma$ may be varied in extremely fine increments within a range from 0° to 180°, to thoroughly search for the cross section Ra having the greatest area.

Next, a line segment having the greatest length from among a plurality of line segments within the detected cross section Ra that perpendicularly intersect the designated long axis La and the ends of which are positioned on the outline of the tumor region V, is designated as a short axis. Specifically, lines within the cross section Ra that extend perpendicular to the long axis La are sequentially set at increments d that do not practically deteriorate the evaluation results of the tumor, for example, 1 voxel increments, as illustrated in FIG. 5. The lengths of line segments Si (i=1, 2, ... ) having two points C3 and C4 that intersect with the outline of the tumor region V as its ends are measured, and the line segment having the greatest length among these is designated as a short axis Sa.

Note that here, a case has been described in which the line segment Si having the greatest length was detected while moving the lines along the long axis La at the increment d that does not practically deteriorate the evaluation results of the tumor. Alternatively, the lines may be moved extremely fine increments along the long axis La, to thoroughly search for line segment Si having the greatest length.

Hereinafter, a second embodiment of the process for designating a long axis and a short axis will be described.

First, an arbitrary point Q is set within a tumor region V which has been determined by the tumor region determining section 10 in the same manner as in the first embodiment.

Figure 6:
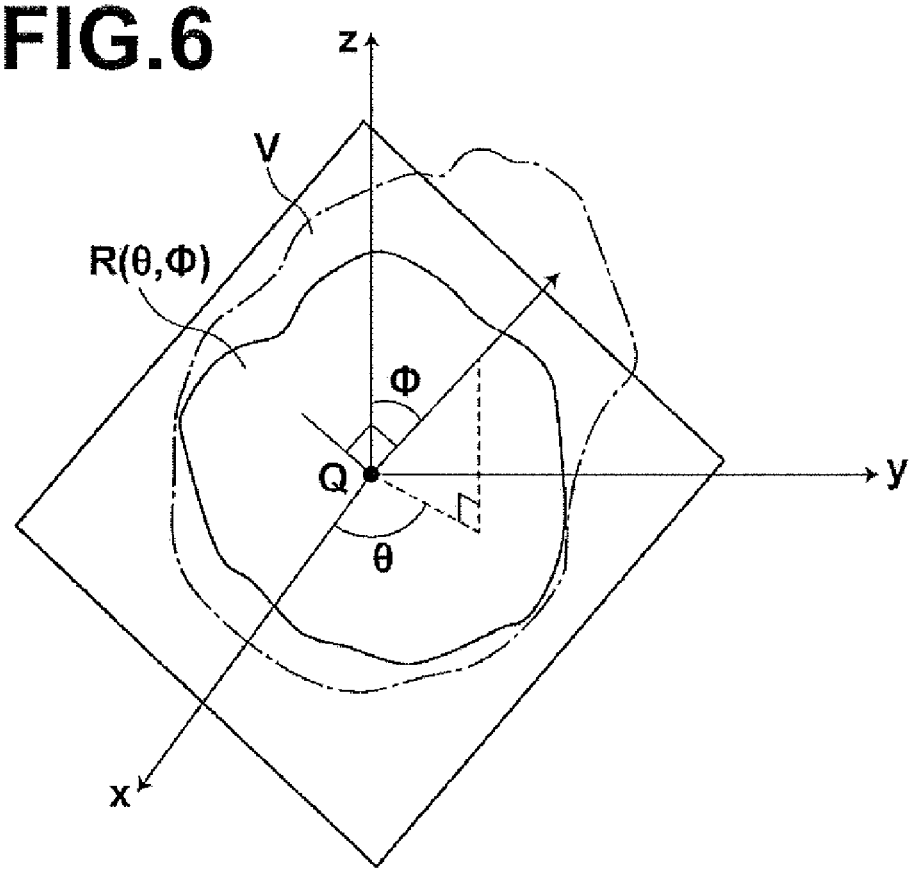
FIG. 6 is a diagram for explaining the method by which a desired cross section is detected by a long axis/short axis designating section in a process according to a second embodiment of the present invention.

Next, a cross section of the tumor region V having the greatest area from among cross sections of the tumor region V that pass through the set arbitrary point Q is detected. Specifically, a three dimensional coordinate system is set having the arbitrary point Q as its origin, as illustrated in FIG. 6, and directions $(\theta, \phi)$ $(0° \leq \theta \leq 360°, 0° \leq \phi \leq 180°)$ emanating from the point Q are set. Here, $\theta$ represents angles in a direction parallel to the X axis, and $\phi$ represents angles in a direction perpendicular to the Z axis. The directions $(\theta, \phi)$ are varied, by maintaining $\theta$ at 0° and sequentially changing $\phi$ from 0°, 15°, 30° ... to 180°; maintaining $\theta$ at 15° and sequentially changing $\phi$ from (0°), 15°, 30° ... 165°, (180°); ... and maintaining $\theta$ at 345° and sequentially changing $\phi$ from (0°), 15°, 30° ... 165°, (180°). Then, the areas of cross sections $R(\theta, \phi)$ having the directions $(\theta, \phi)$ as their normal lines and that pass through the origin Q are obtained, and a cross section Ra2 having the greatest area from among the cross sections R(θ, φ) is detected.

Note that here, a case has been described in which the cross section Ra2 having the greatest area is searched for while thinning out the directions that extend from the arbitrary point Q in directions parallel to the X axis and perpendicular to the Z axis in 15 degree increments. The increments by which the directions are thinned out may be any amount that does not practically deteriorate the evaluation results of the tumor, and may be set arbitrarily as necessary. Alternatively, the cross section Ra having the greatest area may be searched for thoroughly in all directions from the arbitrary point Q.

Next, a line segment having the greatest length from among a plurality of line segments within the detected cross section Ra and the ends of which are positioned on the outline of the tumor region V, is designated as a long axis La. Specifically, different combinations of two points are selected sequentially, from among a plurality of points which are set on the outline of the cross section Ra2 at predetermined intervals. The distances between the combinations of the two points are obtained, and the line segment having the combination of points having the greatest distance therebetween as its ends is designated as the long axis La.

Next, a line segment having the greatest length from among a plurality of line segments that perpendicularly intersect the designated long axis La and the ends of which are positioned on the outline of the tumor region V, is designated as a short axis Sa, in the same manner as in the first embodiment described above.

Hereinafter, a third embodiment of the process for designating a long axis and a short axis will be described.

Figure 7:
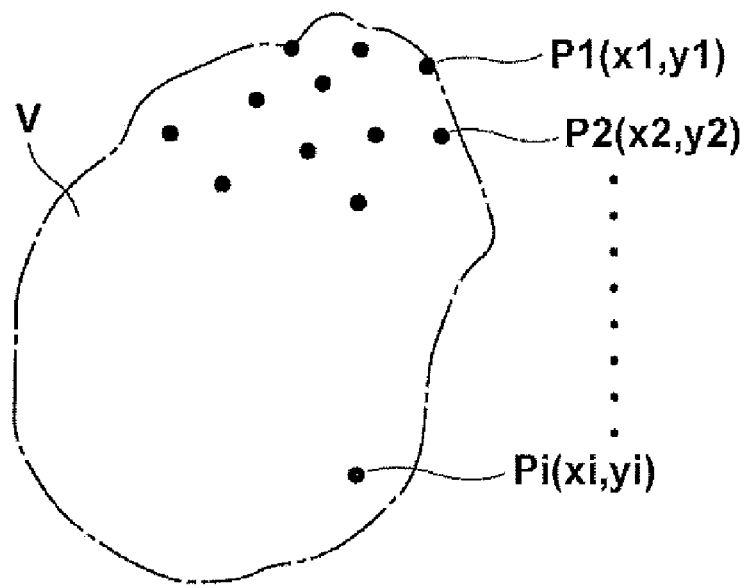
FIG. 7 is a diagram for explaining the method by which a long axis is designated by a long axis/short axis designating section in a process according to a third embodiment of the present invention.

First, a line segment that connects two points on the outline of a tumor region V having the greatest distance therebetween is designated as a long axis La. Specifically, different combinations of two points are selected sequentially, from among a plurality of points P1 (x1, y1); P2 (x2, y2); . . . Pi (xi, yi), which are set on the outline of the tumor region V, as illustrated in FIG. 7. The distances between the combinations of the two points are obtained, and the line segment having the combination of points having the greatest distance therebetween as its ends is designated as the long axis La.

Next, a cross section Ra3 of the tumor region V having the greatest area from among cross sections of the tumor region V that include the long axis La is detected in the same manner as in the first embodiment. Then, a line segment having the greatest length from among a plurality of line segments within the detected cross section Ra3 that perpendicularly intersect the designated long axis La and the ends of which are positioned on the outline of the tumor region V, is designated as a short axis Sa.

Hereinafter, a fourth embodiment of the process for designating a long axis and a short axis will be described.

First, a line segment that connects two points on the outline of a tumor region V having the greatest distance therebetween is designated as a long axis La, in the same manner as in the third embodiment.

Figure 8:
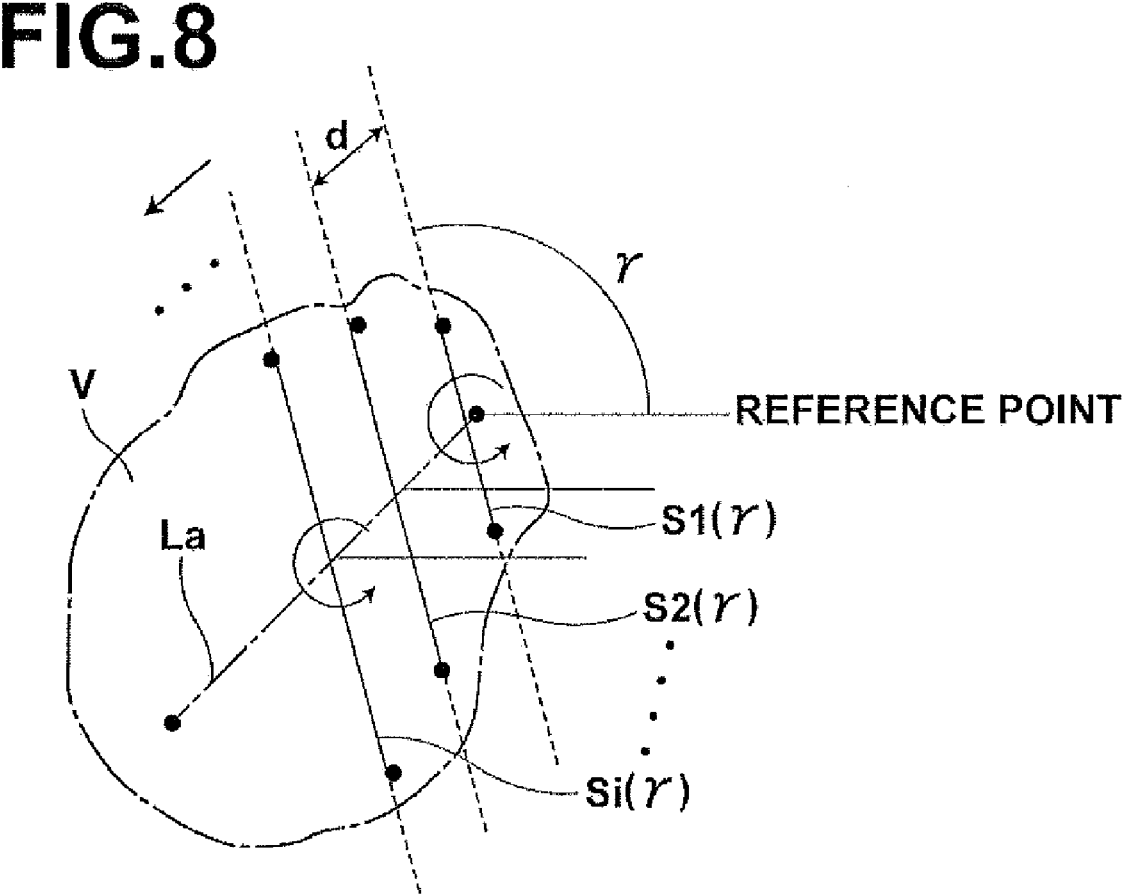
FIG. 8 is a diagram for explaining the method by which a short axis is designated by a long axis/short axis designating section in a process according to a fourth embodiment of the present invention.

Next, a line segment having the greatest length from among a plurality of line segments that perpendicularly intersect the designated long axis La and the ends of which are positioned on the outline of the tumor region V, is designated as a short axis Sa. Specifically, angles γ (0°≦γ≦360°) are set in the counterclockwise direction from a reference point (an angular position designated as a reference) with the long axis La as the central axis, as illustrated in FIG. 8. The angle γ is sequentially varied at increments of 15 degrees, and line segments Si(γ) that extend in the directions of the angles γ through positions set along the long axis La at intervals d (one voxel intervals, for example) and have two points that intersect with the outline of the tumor region V are set. The length of each line segment Si (γ) is obtained, and the line segment Si (γ) having the greatest length is designated as the short axis Sa. Here, the increments by which the angles γ are thinned out and the interval d may be any amount that does not practically deteriorate the evaluation results of the tumor, and may be set arbitrarily as necessary.

The length obtaining section 30 obtains the lengths of the long axes La and the short axes Sa of tumor regions V, which have been designated by the long axis/short axis designating section 20, as the sizes of the tumor regions. For example, the lengths of the long axes La and the short axes Sa may be obtained by measurement. If the lengths of the long axes La and/or the short axes Sa measured during the designating process for the long axes La and the short axes Sa performed by the long axis/short axis designating section 20, these known values may be obtained.

Figure 9:
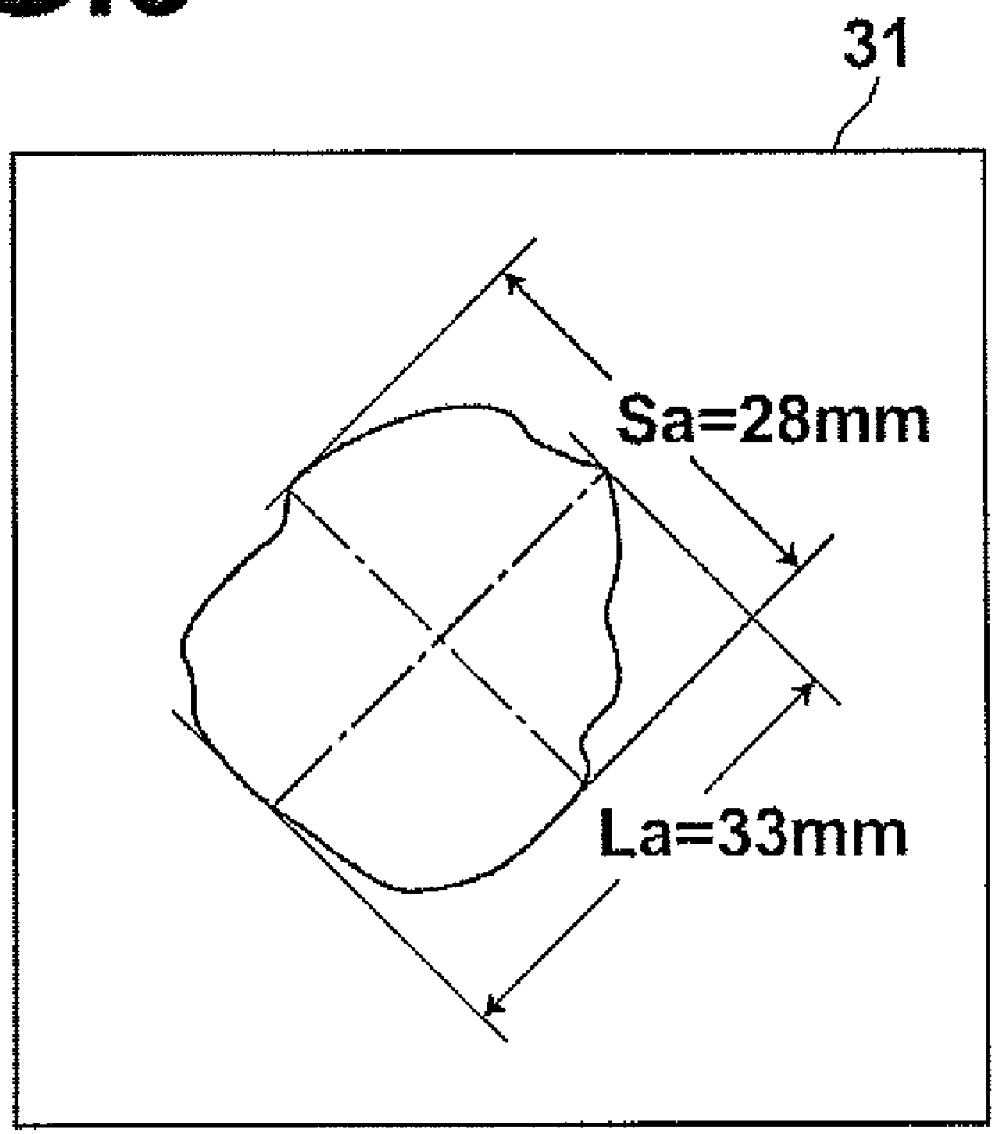
FIG. 9 is a diagram that illustrates an example of a display screen which is displayed by a display section.

The display section 40 displays the designated long axes La and the designated short axes Sa on the screen of a display device, such as a monitor. Alternatively, the display section 40 displays the lengths of the designated long axes La and the designated short axes Sa. As a further alternative, the display section 40 displays both the designated long axes La and the designated short axes Sa and the lengths thereof. For example, the positions and lengths of a long axis La and a short axis Sa may be displayed overlapped with an image of a cross sectional image 31 of a tumor region that includes the long axis La and the short axis Sa, as illustrated in FIG. 9.

According to the embodiments described above, a tumor region V is determined from within a three dimensional medical image, a long axis La and a short axis Sa of the determined tumor region V are designated, and the lengths of the designated long axis La and the designated short axis Sa are obtained as the size of the tumor region V. Thereby, the lengths of a long axis La and a short axis Sa that appropriately reflect the three dimensional size of a tumor can be provided.

In the case that the designation of the long axis La and the short axis Sa comprises the steps of: setting an arbitrary point Q within the determined tumor region V; designating a line segment having the greatest length from among a plurality of line segments that pass through the set arbitrary point Q and the ends of which are positioned on the outline of the tumor region V, as the long axis La; detecting a cross section Ra of the tumor region V having the greatest area from among cross sections of the tumor region V that include the long axis La; and designating a line segment having the greatest length from among a plurality of line segments within the detected cross section Ra that perpendicularly intersect the designated long axis La and the ends of which are positioned on the outline of the tumor region V, as the short axis Sa, a long axis La and a short axis Sa which are appropriate as indices for evaluating a tumor can be designated.

In the case that the designation of the long axis La and the short axis Sa comprises the steps of: setting an arbitrary point Q within the determined tumor region V; detecting a cross section Ra2 of the tumor region V having the greatest area from among cross sections of the tumor region V that pass through the point Q; designating a line segment having the greatest length from among a plurality of line segments within the detected cross section Ra2 and the ends of which are positioned on the outline of the tumor region V, as the long axis La; and designating a line segment having the greatest length from among a plurality of line segments that perpendicularly intersect the designated long axis La and the ends of which are positioned on the outline of the tumor region V, as the short axis Sa, a long axis La and a short axis Sa which are appropriate as indices for evaluating a tumor can be designated.

In the case that the designation of the long axis La and the short axis Sa comprises the steps of: designating a line segment that connects two points on the outline of the tumor region V having the greatest distance therebetween as the long axis La; detecting a cross section Ra3 of the tumor region having the greatest area from among cross sections of the tumor region V that include the long axis La; and designating a line segment having the greatest length from among a plurality of line segments within the detected cross section Ra3 that perpendicularly intersect the designated long axis La and the ends of which are positioned on the outline of the tumor region V, as the short axis Sa, a long axis La and a short axis Sa which are appropriate as indices for evaluating a tumor can be designated.

In the case that the designation of the long axis La and the short axis Sa comprises the steps of: designating a line segment that connects two points on the outline of the tumor region V having the greatest distance therebetween as the long axis La; and designating a line segment having the greatest length from among a plurality of line segments that perpendicularly intersect the designated long axis La and the ends of which are positioned on the outline of the tumor region V, as the short axis Sa, a long axis La and a short axis Sa which are appropriate as indices for evaluating a tumor can be designated.

Note that in the first and second embodiments of the process for designating the long axis and the short axis described above, the long axis/short axis designating section 20 designated the long axis and the short axis based on a single arbitrary point which was set within the tumor region V. Alternatively, a plurality of arbitrary points may be set at the centers of gravity of a plurality of cross sections of the tumor region. In this case, the designation of the long axis is performed by obtaining a line segment which has the greatest length by the process for designating a long axis according to the first or second embodiments, for each set arbitrary point. Then, the line segment having the greatest length from among the obtained line segments is designated as the long axis La.

For example, a line segment having the greatest length from among a plurality of line segments that pass through the set arbitrary point and the ends of which are positioned on the outline of the tumor region V, may be obtained for each set arbitrary point. Then, the line segment having the greatest length from among the obtained line segments may be designated as the long axis La. Alternatively, a cross section of the tumor region V having the greatest area from among cross sections of the tumor region V that pass through the set arbitrary point may be detected for each set arbitrary point. Then, the cross section having the greatest area from among the detected cross sections that pass through the set arbitrary point may be detected. Thereafter, a line segment having the greatest length from among a plurality of line segments within the detected cross section and the ends of which are positioned on the outline of the tumor region V, may be designated as the long axis La.

Note that the plurality of cross sections of the tumor region V may be any set of two or more cross sections that pass through the tumor region V, such as: cross sections, which are perpendicular to the body axis of the tumor region V, extracted at predetermined intervals along the body axis; cross sections, of which the directions are randomly set; and cross sections, of which the positions are randomly set.

What is claimed is:

1. A tumor region size measuring method comprising the steps of:
    determining a tumor region, which is a three dimensional region that represents a tumor, from a three dimensional medical image;
    designating a long axis and a short axis of the determined tumor region; and
    obtaining the lengths of the designated long axis and the designated short axis as the size of the tumor region, wherein:
    the designation of the long axis and the short axis comprises the steps of:
    setting an arbitrary point within the determined tumor region;
    designating a line segment having the greatest length from among a plurality of line segments that pass through the set arbitrary point and the ends of which are positioned on the outline of the tumor region, as the long axis;
    detecting a cross section of the tumor region having the greatest area from among cross sections of the tumor region that include the long axis; and
    designating a line segment having the greatest length from among a plurality of line segments within the detected cross section that perpendicularly intersect the designated long axis and the ends of which are positioned on the outline of the tumor region, as the short axis.

2. A tumor region size measuring method as defined in claim 1, wherein: the designated long axis and the designated short axis are displayed on a display means.

3. A tumor region size measuring method as defined in claim 1, wherein: the lengths of the designated long axis and the designated short axis are displayed on a display means.

4. A tumor region size measuring method as defined in claim 1, wherein: the setting of the arbitrary point is performed by setting the arbitrary point at the center of gravity of the tumor region.

5. A tumor region size measuring method as defined in claim 1, wherein: the setting of the arbitrary point is performed by setting a plurality of arbitrary points at the centers of gravity of a plurality of cross sections of the tumor region; and the designation of the long axis is performed by obtaining a line segment having the greatest length from among a plurality of line segments that pass through each of the set arbitrary points and the ends of which are positioned on the outline of the tumor region, and designating the line segment having the greatest length from among the obtained line segments.

6. A tumor region size measuring method as defined in claim 1, wherein: the designation of the long axis is performed by obtaining the lengths of line segments that extend in a number of directions which have been thinned out from all directions from the arbitrary point, and designating the line segment having the greatest length from among these line segments as the long axis.

7. A tumor region size measuring method comprising the steps of:
    determining a tumor region, which is a three dimensional region that represents a tumor, from a three dimensional medical image;
    designating a long axis and a short axis of the determined tumor region; and
    obtaining the lengths of the designated long axis and the designated short axis as the size of the tumor region, wherein:
    the designation of the long axis and the short axis comprises the steps of:

setting an arbitrary point within the determined tumor region;

detecting a cross section of the tumor region having the greatest area from among cross sections of the tumor region that pass through the point;

designating a line segment having the greatest length from among a plurality of line segments within the detected cross section and the ends of which are positioned on the outline of the tumor region, as the long axis; and designating a line segment having the greatest length from among a plurality of line segments that perpendicularly intersect the designated long axis and the ends of which are positioned on the outline of the tumor region, as the short axis.

8. A tumor region size measuring method as defined in claim 7, wherein: the designated long axis and the designated short axis are displayed on a display means.

9. A tumor region size measuring method as defined in claim 7, wherein: the lengths of the designated long axis and the designated short axis are displayed on a display means.

10. A tumor region size measuring method as defined in claim 7, wherein: the setting of the arbitrary point is performed by setting the arbitrary, point at the center of gravity of the tumor region.

11. A tumor region size measuring method as defined in claim 7, wherein: the setting of the arbitrary point is performed by setting a plurality of arbitrary points at the centers of gravity of a plurality of cross sections of the tumor region; the designation of the long axis is performed by obtaining a line segment having the greatest length from among a plurality of line segments that pass through each of the set arbitrary points and the ends of which are positioned on the outline of the tumor region, and designating the line segment having the greatest length from among the obtained line segments.

12. A tumor region size measuring method as defined in claim 7, wherein: the detection of the cross section is performed by obtaining the areas of cross sections of the tumor region that pass through the arbitrary point and have as their normal lines a number of directions which have been thinned out from all directions from the arbitrary point, and detecting the cross section having the greatest area from among these cross sections.

13. A tumor region size measuring method comprising the steps of:
determining a tumor region, which is a three dimensional region that represents a tumor, from a three dimensional medical image;

designating a long axis and a short axis of the determined tumor region: and obtaining the lengths of the designated long axis and the designated short axis as the size of the tumor region, wherein:

the designation of the long axis and the short axis comprises the steps of:

designating a line segment that connects two points on the outline of the tumor region having the greatest distance therebetween as the long axis;

detecting a cross section of the tumor region having the greatest area from among cross sections of the tumor region that include the long axis; and designating a line segment having the greatest length from among a plurality of line segments within the detected cross section that perpendicularly intersect the designated long axis and the ends of which are positioned on the outline of the tumor region, as the short axis.

14. A tumor region size measuring method as defined in claim 13, wherein: the designated long axis and the designated short axis are displayed on a display means.

15. A tumor region size measuring method as defined in claim 13, wherein: the lengths of the designated long axis and the designated short axis are displayed on a display means.

16. A tumor region size measuring method as defined in claim 13, wherein: the designation of the long axis is performed by sequentially selecting combinations of pairs of points from among a plurality of points which are set at predetermined intervals along the outline of the tumor region, obtaining the lengths between the selected combinations of points, and designating the line segment having a pair of points that have the greatest distance therebetween as the two ends thereof as the long axis.

17. A tumor region size measuring method comprising the steps of:
determining a tumor region, which is a three dimensional region that represents a tumor, from a three dimensional medical image;

designating a long axis and a short axis of the determined tumor region; and obtaining the lengths of the designated long axis and the designated short axis as the size of the tumor region, wherein:

the designation of the long axis and the short axis comprises the steps of:

designating a line segment that connects two points on the outline of the tumor region having the greatest distance therebetween as the long axis; and designating a line segment having the greatest length from among a plurality of line segments that perpendicularly intersect the designated long axis and the ends of which are positioned on the outline of the tumor region, as the short axis.

18. A tumor region size measuring method as defined in claim 17, wherein: the designated long axis and the designated short axis are displayed on a display means.

19. A tumor region size measuring method as defined in claim 17, wherein: the designation of the long axis is performed by sequentially selecting combinations of pairs of points from among a plurality of points which are set at predetermined intervals along the outline of the tumor region, obtaining the lengths between the selected combinations of points, and designating the line segment having a pair of points that have the greatest distance therebetween as the two ends thereof as the long axis.

20. A tumor region size measuring apparatus, comprising:
tumor region determining means for determining a tumor region from a three dimensional medical image:

axis designating means for designating a long axis and a short axis of the determined tumor region; and obtaining means for obtaining the lengths of the designated long axis and the designated short axis as the size of the tumor region;

the axis designating means performing the steps of:

setting an arbitrary point within the determined tumor region;

designating a line segment having the greatest length from among a plurality of line segments that pass through the set arbitrary point, the ends of which are positioned on the outline of a tumor region, as the long axis of the tumor region;

detecting the cross section having the greatest area from among cross sections of the tumor region that include the designated long axis; and designating the longest line segment from among line segments perpendicular to the designated long axis that connect two points along the outline of the tumor region as the short axis of the tumor region.

21. A non-transitory computer readable medium having a program recorded thereon that causes a computer to execute the procedures of:

determining a tumor region from a three dimensional medical image;

designating a long axis and a short axis of the determined tumor region; and obtaining the lengths of the designated long axis and the designated short axis as the size of the tumor region;

the axis designating procedure including the steps of:

setting an arbitrary point within the determined tumor region;

designating a line segment having the greatest length from among a plurality of line segments that pass through the set arbitrary point, the ends of which are positioned on the outline of a tumor region, as the long axis of the tumor region;

detecting the cross section having the greatest area from among cross sections of the tumor region that include the designated long axis; and designating the longest line segment from among line segments perpendicular to the designated long axis that connect two points along the outline of the tumor region as the short axis of the tumor region.

* * * * *